(12) United States Patent
Shestak et al.

(10) Patent No.: US 8,049,710 B2
(45) Date of Patent: Nov. 1, 2011

(54) MULTI-VIEW AUTOSTEREOSCOPIC DISPLAY WITH IMPROVED RESOLUTION

(75) Inventors: Sergey Shestak, Suwon-si (KR); Dae-sik Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1057 days.

(21) Appl. No.: 11/852,467

(22) Filed: Sep. 10, 2007

(65) Prior Publication Data

US 2008/0068329 A1    Mar. 20, 2008

(30) Foreign Application Priority Data

Sep. 15, 2006  (KR) .......................... 10-2006-0089646

(51) Int. Cl.
*G09G 3/36*    (2006.01)
(52) U.S. Cl. .................... 345/102; 345/6; 345/7; 345/9; 345/108
(58) Field of Classification Search .................. 345/4–9, 345/102–109, 204–215; 349/15, 112, 139
See application file for complete search history.

(56) References Cited

U.S. PATENT DOCUMENTS

| | | | |
|---|---|---|---|
| 5,570,210 A * | 10/1996 | Yoshida et al. | 349/86 |
| 5,706,065 A * | 1/1998 | Yano | 349/112 |
| 6,473,141 B2 * | 10/2002 | Moseley et al. | 349/15 |
| 6,611,243 B1 * | 8/2003 | Moseley et al. | 345/4 |
| 7,518,663 B2 * | 4/2009 | Cornelissen | 349/15 |
| 2005/0057702 A1 | 3/2005 | Cho et al. | |
| 2005/0264717 A1 * | 12/2005 | Chien et al. | 349/61 |
| 2006/0262558 A1 * | 11/2006 | Cornelissen | 362/613 |
| 2009/0053618 A1 * | 2/2009 | Goehnermeier | 430/5 |

FOREIGN PATENT DOCUMENTS

| | | |
|---|---|---|
| EP | 1078294 B1 | 5/1999 |
| EP | 1001300 A2 | 5/2000 |
| WO | 2004088996 A1 | 10/2004 |

OTHER PUBLICATIONS

Chinese Office Action issued Mar. 29, 2010, in counterpart Chinese Application No. 200780034368.8.

* cited by examiner

*Primary Examiner* — Vijay Shankar
(74) *Attorney, Agent, or Firm* — Sughrue Mion, PLLC

(57) ABSTRACT

A multi-view autostereoscopic display apparatus with improved resolution, includes: a display panel alternately displaying a plurality of images of different view points; an image separating device for separating the plurality of images such that the separated images can be alternately observed in different viewing zones; and a directional backlight unit switched between a plurality of different angular distributions of illumination to selectively provide light to the display panel, wherein the directional backlight unit is switched between the plurality of different angular distributions of illumination in synchronization with an image display period of the display panel.

25 Claims, 15 Drawing Sheets

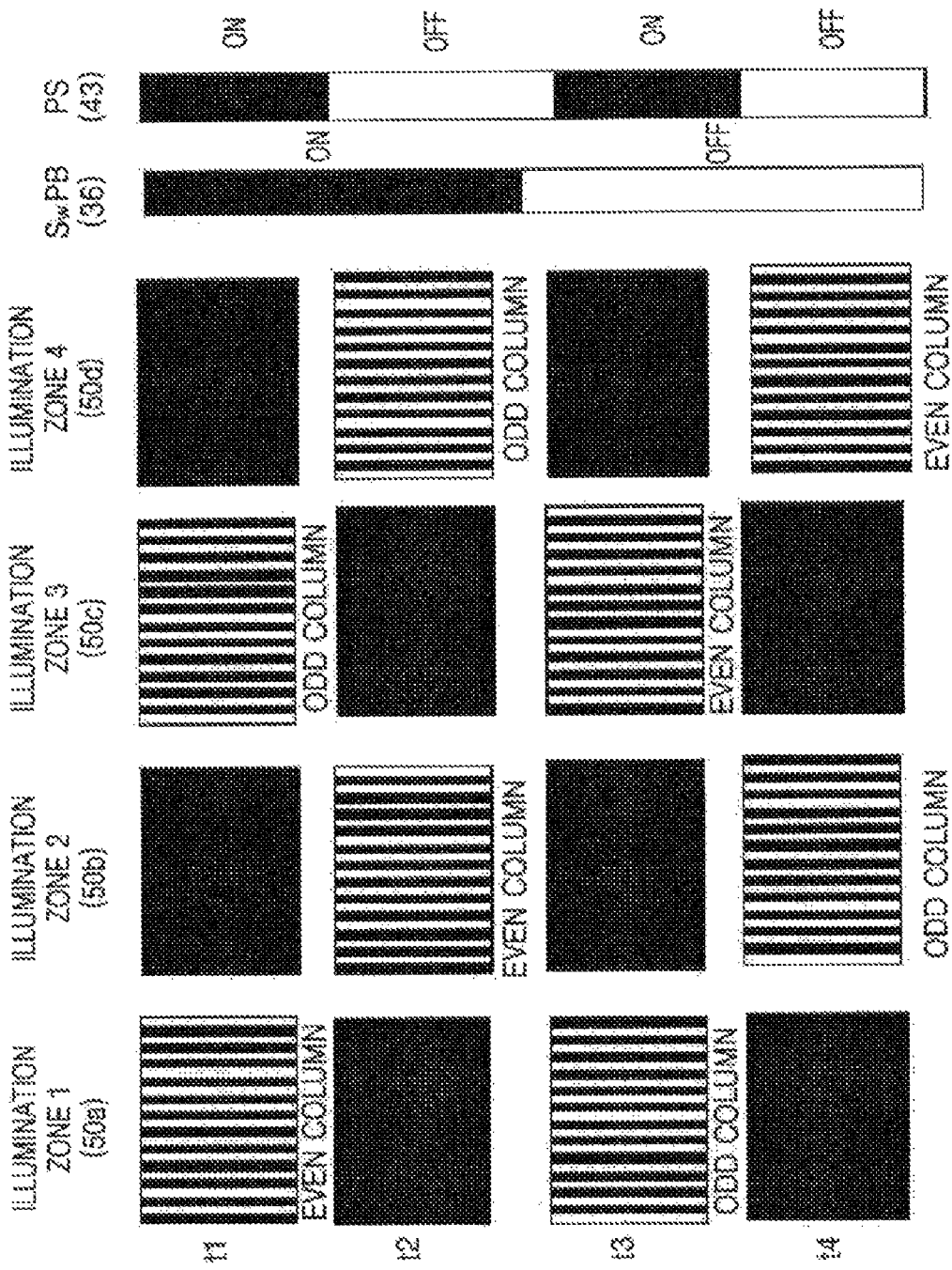

MULTI-VIEW AUTOSTEREOSCOPIC DISPLAY WITH IMPROVED RESOLUTION

CROSS-REFERENCE TO RELATED PATENT APPLICATIONS

This application claims priority from Korean Patent Application No. 10-2006-0089646, filed on Sep. 15, 2006, in the Korean Intellectual Property Office, the disclosure of which is incorporated herein in its entirety by reference.

BACKGROUND OF THE INVENTION

1. Field of the Invention

Apparatuses consistent with the present invention relate to a multi-view autostereoscopic display apparatus and, more particularly, to a multi-view autostereoscopic display apparatus with improved resolution.

2. Description of the Related Art

Autostereoscopic display apparatuses produce a left eye image and a right eye image having a binocular parallax and separately direct the left and right eye images to a left eye and a right eye, respectively. The user recognizes the left eye image and the right eye image provided by the autostereoscopic display apparatuses through the retinas of the corresponding eyes and thus can see a stereoscopic image. In general, autostereoscopic display apparatuses can be roughly classified into a parallax barrier type and a lenticular type.

FIG. 1 shows schematically a related art parallax barrier type autostereoscopic display apparatus 10 including a backlight unit 11, a display panel 12, and a parallax barrier 14. First and second images are displayed on alternating vertical pixels 13 of the display panel 12 and separated by the parallax barrier 14 having vertical narrow slits such that a viewer's left and right eyes respectively see the first and second images. That is, the first and second images displayed on the display panel 12 are separately directed by the parallax barrier 14 toward different viewing zones 15a and 15b. When the two eyes are located in different viewing zones 15a and 15b, the first and second images having binocular parallax are distributed to the left and right eyes such that the two eyes receive the images of different view points to see a stereoscopic image.

A lenticular type autostereoscopic display apparatus using a lenticular lens sheet composed of vertical microlenses produces a stereoscopic image based on the same principle as that of the parallax barrier type autostereoscopic display apparatus of FIG. 1. A stereoscopic image, displayed with the related art parallax barrier type autostereoscopic display apparatus of FIG. 1 or the related art lenticular type autostereoscopic display apparatus, can be seen by several viewers simultaneously. However, the related art autostereoscopic display apparatuses have a problem in that the horizontal resolution of the stereoscopic image appears two times less than the original panel resolution. The related art autostereoscopic display apparatuses have another problem in that the viewer's head needs to be kept horizontally within a narrow zone of about ±3 cm to see a correct stereoscopic image. For example, the viewer's left eye should be located in a second viewing zone 15b and the viewer's right eye should be located in a first viewing zone 15a in FIG. 1. If the left eye is located in a first viewing zone 15a and the right eye is located in a second viewing zone 15b due to his or her slight movement, he or she sees the images in reversed perspective.

FIG. 2 shows schematically a related art 4-view autostereoscopic display apparatus 20 with an improved degree of freedom. Referring to FIG. 2, the multi-view autostereoscopic display apparatus 20 includes a backlight unit 21, a display panel 22, and a parallax barrier 24. While the autostereoscopic display apparatus 10 of FIG. 1 is configured such that each slit of the parallax barrier 14 covers two pixels 13, the multi-view autostereoscopic display apparatus 20 of FIG. 2 is configured such that each slit of the parallax barrier 24 covers four pixels 23. Also, the pixels 23 of the display panel 22 alternately and vertically display first through fourth images of slightly different view points, unlike the pixels 13 of the display panel 12.

Then, referring to FIG. 2, four viewing zones 25a through 25d are repetitively formed in a horizontal direction at a viewing distance in front of the display panel 23. In this case, the viewer's left and right eyes may be respectively located in third and fourth viewing zones 15c and 15d, second and third viewing zones 15b and 15c, or first and second viewing zones 15a and 15c. Accordingly, as the viewer moves from side to side, he or she may see images with slightly changed view points. However, if the viewer's left and right eyes are respectively located in the fourth and first viewing zones 15d and 15a, he or she sees the images in reversed perspective. Such discontinuity features can be solved by increasing the number of view points. However, the greater is the number of view points, the lower is the horizontal resolution. For example, in the 4-view autostereoscopic display apparatus of FIG. 2, horizontal resolution is 4 times lower than the original resolution. In an 8-view autostereoscopic display apparatus, horizontal resolution is 8 times lower than the original resolution.

SUMMARY OF THE INVENTION

Exemplary embodiments of the present invention provide a multi-view autostereoscopic display apparatus with improved resolution.

According to an aspect of the present invention, there is provided an autostereoscopic display apparatus comprising: a display panel alternately displaying a plurality of images of different view points; image separating means for separating the plurality of images such that the separated images can be alternately observed in different viewing zones; and a directional backlight unit switched between a plurality of different angular distributions of illumination to selectively provide light to the display panel, wherein the directional backlight unit is switched between the plurality of different angular distributions of illumination in synchronization with an image display period of the display panel.

The directional backlight unit may comprise: a backlight; a first polarization plate disposed in front of the backlight; a polarization switch which changes the polarization direction of incident light according to an electrical control; a birefringent element array having a plurality of alternating first and second birefringent elements; a lenticular lens sheet having a plurality of parallel lenticular lens elements; and a second polarization plate disposed in front of the lenticular lens sheet.

The polarization switch may be switched between first and second states, in which the polarization directions of light transmitted therethrough are perpendicular to each other, in synchronization with the image display period of the display panel.

The polarization switch may not change the polarization direction of incident light in the first state, and may change by 90° the polarization direction of incident light in the second state.

The polarization switch may be divided into a plurality of horizontal segments.

One of the horizontal segments of the polarization switch may correspond to a plurality of pixel lines of the display panel, and the respective horizontal segments may be sequentially switched in synchronization with image display periods of their corresponding pixel lines.

The polarization switch may be an electrically controllable liquid crystal retarder.

The birefringent element array may be formed by alternately arranging a plurality of vertical first and second birefringent elements in a horizontal direction.

The first and second birefringent elements may respectively change the polarization directions of incident light such that the polarization directions of light transmitted therethrough can be perpendicular to each other.

The first and second birefringent elements may be retarders that delay the phase of incident light, and a phase delay difference between the retarders of the first birefringent elements and the retarders of the second birefringent elements may be $\lambda/2$.

When the polarization switch is in the first state, the polarization direction of light transmitted through the first birefringent elements may be perpendicular to a polarization plane of the second polarization plate and the polarization direction of light transmitted through the second birefringent elements may be parallel to the polarization plane of the second polarization plate, and when the polarization switch is in the second state, the polarization direction of light transmitted through the first birefringent elements may be parallel to the polarization plane of the second polarization plate and the polarization direction of light transmitted through the second birefringent elements may be perpendicular to the polarization plane of the second polarization plate.

The lenticular lens sheet may be configured such that a plurality of vertical lenticular lens elements parallel to the birefringent elements of the birefringent element array are arranged in a horizontal direction.

The pitch between the lens elements of the lenticular lens sheet may be equal to or smaller than the pitch between the first and second birefringent element pairs of the birefringent element array.

When the display panel is a liquid crystal display panel, the second polarization plate may be disposed on the incident side of the liquid crystal display panel.

The image separating means may be one of a lenticular lens sheet and a parallax barrier.

The display panel may alternately display first and second images in a horizontal direction in a frame, and may alternately display third and fourth images in a horizontal direction in a next frame.

The directional backlight unit may alternately illuminate two viewing zones in a frame, and may alternately illuminate another two viewing zones in a next frame.

The display panel may alternately displays first and third image in a horizontal direction in a frame, and may alternately display second and fourth images in a horizontal direction in a next frame.

The directional backlight unit may illuminate a half of each viewing zone in a frame, and may illuminate the other half of each viewing zone in a next frame.

The image separating means may be a switchable parallax barrier which includes a spatial light modulator having a plurality of cells switched between a transparent state and an opaque state according to a power ON/OFF procedure.

The display panel may alternately display a first image on even column pixels and a second image on odd column pixels in a first frame, may alternately display a third image on even column pixels and a fourth image on odd column pixel in a second frame, may alternately display a first image on odd column pixels and a second image on even column pixels in a third frame, and may alternately display a third image on odd column pixels and a fourth image on even column pixels.

The directional backlight unit may alternately illuminates two viewing zones in a frame, and may alternately illuminate the other two viewing zones in a next frame.

The switchable parallax barrier may be switched for every two frames between a state where odd cells are transparent and even cells are opaque and the other state where even cells are transparent and odd cells are opaque, by being synchronized with the image display period of the display panel.

The display panel may alternately display a first image on even column pixels and a third image on odd column pixels in a first frame, may alternately display a second image on even column pixels and a fourth image on odd column pixels in a second frame, may alternately display a first image on odd column pixels and a third image on even column pixels in a third frame, and may alternately display a second image on odd column pixels and a fourth image on even column pixels in a fourth frame.

The directional backlight unit may illuminate a half of each viewing zone in a frame, and may illuminate the other half of each viewing zone in a next frame.

The switchable parallax barrier may be switched for every two frames between a state where odd cells are transparent and even cells are opaque and the other state where even cells are transparent and odd cells are opaque, by being synchronized with the image display period of the display panel.

BRIEF DESCRIPTION OF THE DRAWINGS

The above and other features and advantages of the present invention will become more apparent by describing in detail exemplary embodiments thereof with reference to the attached drawings, in which:

FIG. 14 is a timing diagram illustrating images observed from respective view points by another operation of the autostereoscopic display apparatus of FIG. 12.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
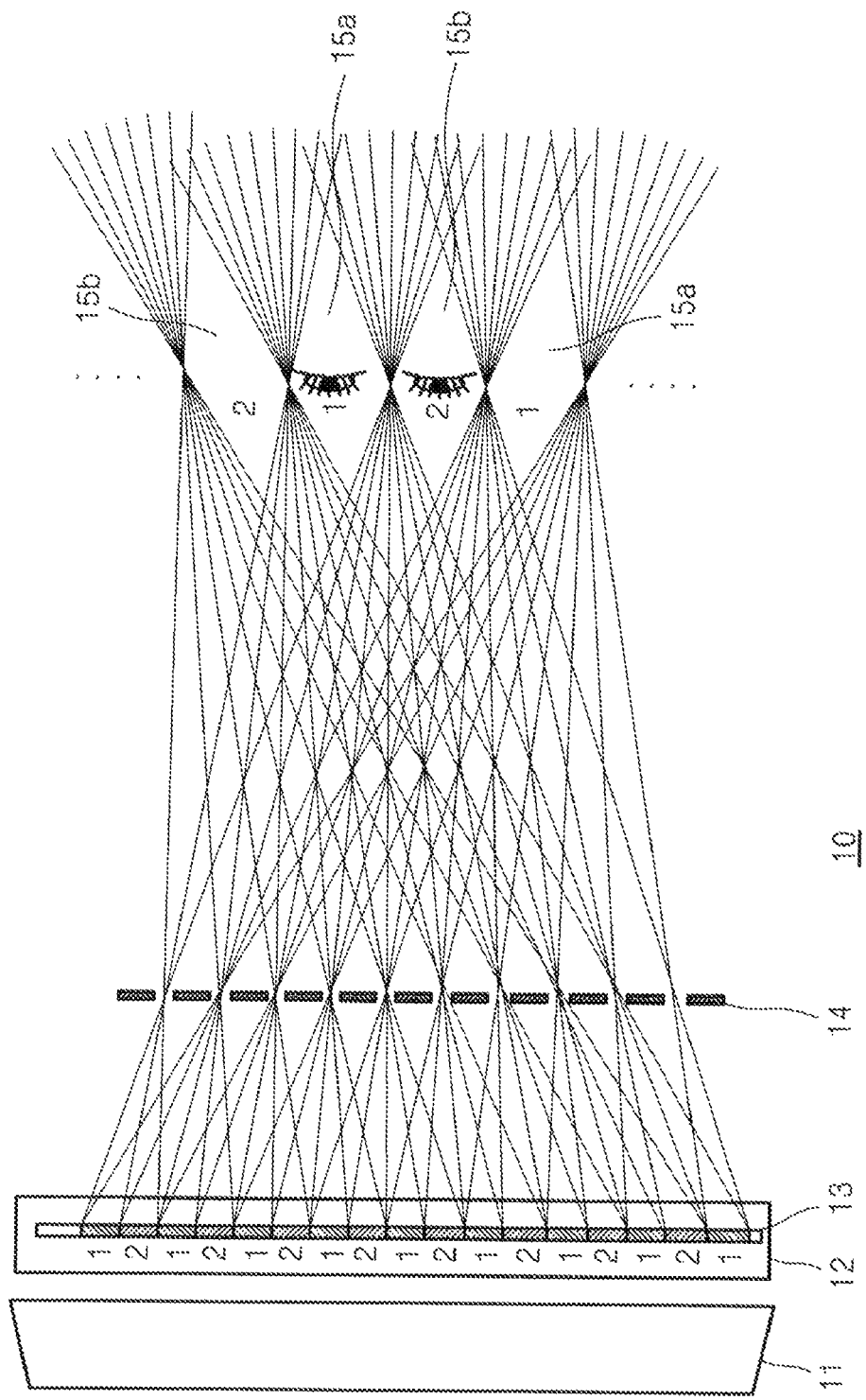
FIG. 1 shows schematically a related art parallax barrier type autostereoscopic display apparatus.
Figure 2:
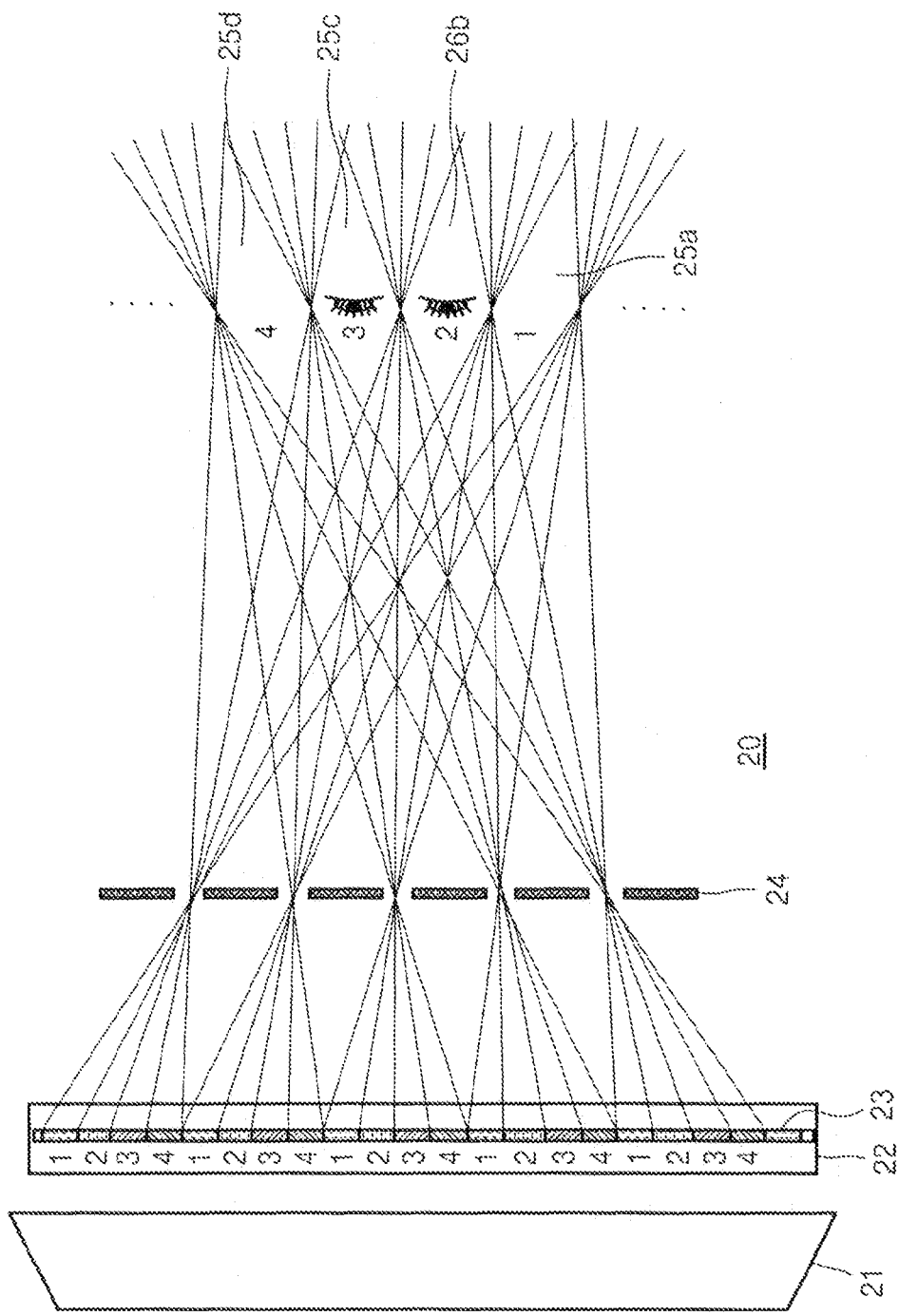
FIG. 2 shows schematically a related art parallax barrier type multi-view autostereoscopic display apparatus.
Figure 3:
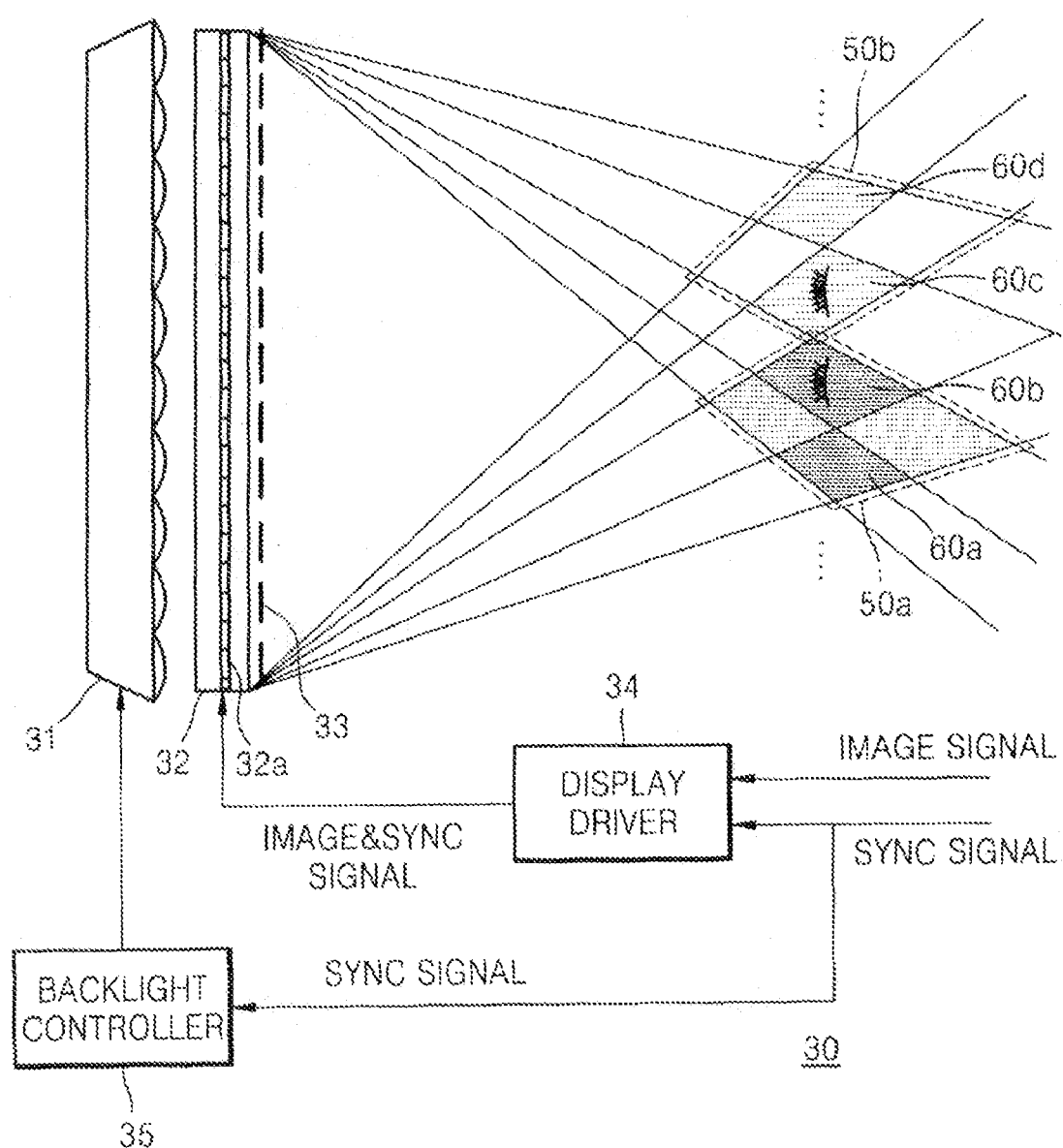
FIG. 3 shows schematically a high resolution multi-view autostereoscopic display apparatus according to an exemplary embodiment of the present invention.

FIG. 3 shows schematically a high resolution multi-view autostereoscopic display apparatus 30 according to an exemplary embodiment of the present invention. Referring to FIG. 3, the autostereoscopic display apparatus 30 includes a display panel 32 alternately displaying a plurality of images of different view points, image separating means 33 for separating the plurality of images such that the separated image can be alternately observed in different viewing zones, and a directional backlight unit 31 switched between a plurality of different angular distributions of illumination to selectively provide light to the display panel 32.

The display panel 32, which is a transmission type display panel requiring a separate light source, such as a backlight unit, may be a liquid crystal display (LCD) panel. The display panel 32 includes a plurality of micro pixels 32a for displaying images. Also, the display panel 32 can alternately display a plurality of images of slightly different view points on a pixel by pixel basis according to the control of a display driver 34. According to the present exemplary embodiment, the display panel 32 may have a high refresh rate of approximately 100 to 120 Hz.

The image separating means 33 separates the plurality of images, which are alternately displayed by the display panel 32, such that the separated images can be observed in different viewing zones 60a through 60d. For example, the image separating means 33 may be a parallax barrier, which has an array of vertical slits, or a lenticular lens sheet, which has vertical microlenses. FIG. 3 illustrates a parallax barrier where a slit is formed for two pixels. However, the present exemplary embodiment is not limited thererto, and a lenticular lens sheet instead of the parallax barrier may be used as the image separating means 33. The number and positions of slits of the parallax barrier may be changed according to the number of images which are simultaneously displayed by the display panel 32. Although the image separating means 33 is disposed in front of the display panel 32 in FIG. 3, the image separating means 33 may be disposed between the display panel 32 and the directional backlight unit 31.

The directional backlight unit 31 is switched between a plurality of different angular distributions of illumination according to the control of a backlight controller 35 so as to selectively provide light to the display panel 32. That is, the directional backlight unit 31 is switched between a plurality of different angular distributions of illumination in synchronization with an image display period of the display panel 32. As a result, as shown in FIG. 3, a plurality of illumination zones 50a and 50b (marked by dotted lines) which are switched in synchronization with the image display period of the display panel 32 are formed at a viewing distance.

Figure 4:
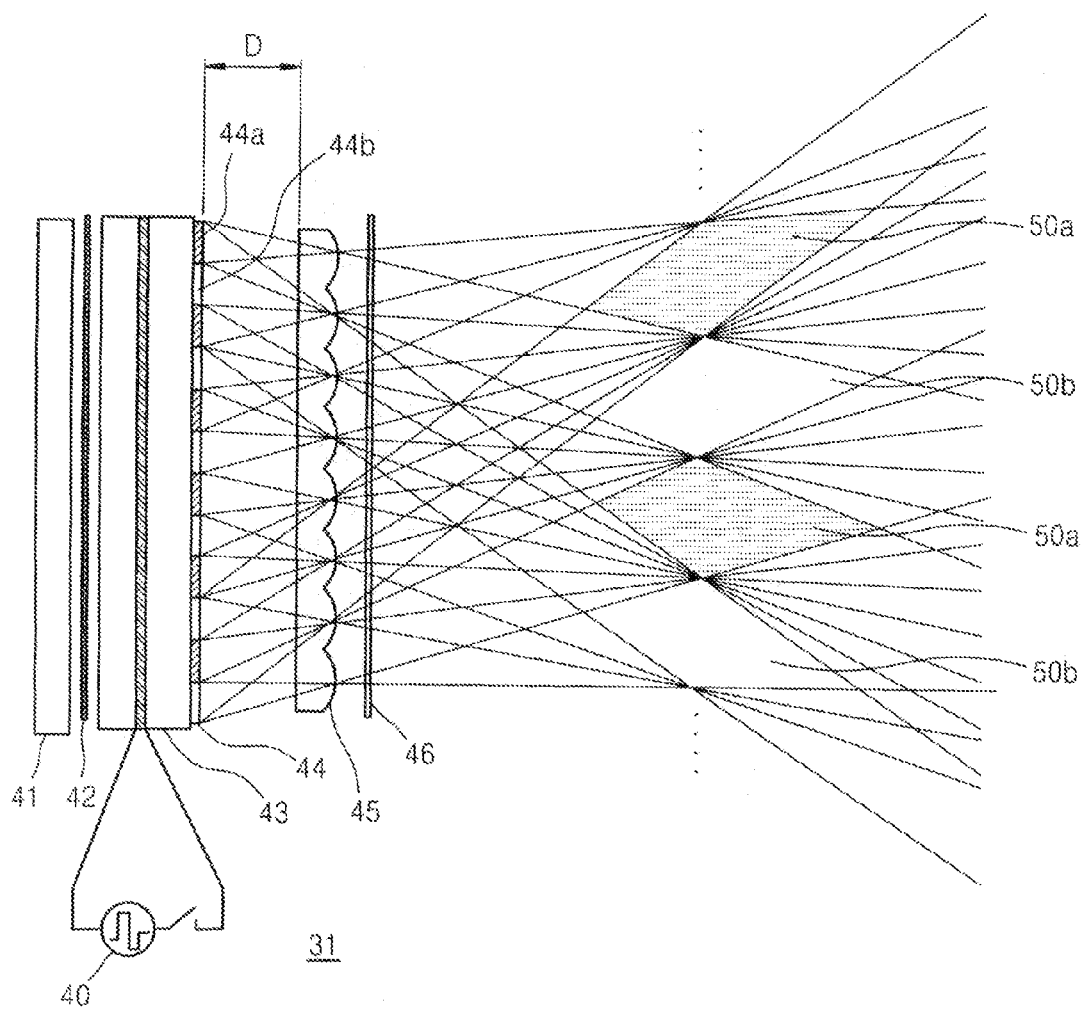
FIG. 4 shows schematically a directional backlight unit according to an exemplary embodiment of the present invention.

FIG. 4 is a detailed view illustrating the directional backlight unit 31. Referring to FIG. 4, the directional backlight unit 31 includes a backlight 41, a first polarization plate 42 disposed in front of the backlight 41, a polarization switch 43 for changing the polarization direction of incident light in response to an electrical signal, a birefringent element array 44 having a plurality of alternating first and second birefringent elements 44a and 44b, a lenticular lens sheet 45 having a plurality of parallel lens elements, and a second polarization plate 46 disposed in front of the lenticular lens sheet 45. In general, a conventional backlight having a light source and a light diffusion plate to uniformly emit light can be used as the backlight 41. Also, when the display panel is an LCD panel, the second polarization plate 46 is an incident side polarization plate of the LCD panel disposed on the incident side of the LCD panel.

The polarization switch 43 may be switched, in synchronization with the image display period of the display panel 32, between first and second states where the polarization directions of light transmitted therethrough are perpendicular to each other. For example, the polarization switch 43 does not change the polarization direction of incident light in the first state, and changes by 90° the polarization direction of incident light in the second state. However, the degree of change of polarization direction of incident light is not limited thereto. Rather, the degree of polarization of incident light may be differently designed according to the directions of polarization planes of the first and second polarization plates 42 and 46 and the birefringent element array 44, if a difference in the polarization direction of light between when the polarization switch 43 is in the first state and when it is in the second state is 90°. The polarization switch 43 is an electrically controllable element which has three anisotropic states according to the magnitude of voltage applied thereto. For example, an electrically controllable liquid crystal retarder may be used as the polarization switch 43. In this case, the polarization switch 43 is configured such that any phase shift of incident light is not produced in the first state, and the phase of incident light is delayed by a half wavelength ($\lambda/2$) in the second state. The polarization switch 43 may be controlled in such a manner that a switch 40 is turned on or off according to a synchronization signal provided by the backlight controller 35.

The birefringent element array 44 is formed by alternately arranging the plurality of vertical first and second birefringent elements 44a and 44b in a horizontal direction. Although not shown in FIG. 4, the first and second birefringent elements 44a and 44b elongate in a vertical direction of the autostereoscopic display apparatus 30, and alternate in a horizontal direction. According to the present exemplary embodiment, the birefringent element array 44 may change the polarization directions of incident light so that the polarization directions of light transmitted through the first and second birefringent elements 44a and 44b can be perpendicular to each other.

To this end, the first and second birefringent elements 44a and 44b may be retarders that delay incident light by a predetermined phase. In this case, the phase delay difference between the retarders of the first birefringent elements 44a and the retarders of the second birefringent elements 44b is $\lambda/2$. For example, the first birefringent elements 44a may not produce any phase shift and the second birefringent elements 44b may delay the phase of light by $\lambda/2$, or the first birefringent elements 44a may delay the phase of light by $-\lambda/4$ and the second birefringent elements 44b may delay the phase of light by $+\lambda/4$. Alternatively, the first and second birefringent elements 44a and 44b may be rotators that rotate incident light at predetermined angles. In this case, the angle difference between the rotators of the first birefringent elements 44a and the rotators of the second birefringent elements 44b is 90°. For example, the first birefringent elements 44a may not rotate incident light and the second birefringent elements 44b may rotate incident light at 90°, or the first birefringent elements 44a may rotate incident light at −45° and the second birefringent elements 44b may rotate incident light at +45°.

Consistent with the present embodiment, light transmitted through the polarization switch 43 and the birefringent element array 44 can have one of two polarization directions according to the state of the polarization switch 43. First, the polarization direction of light transmitted through the first birefringent elements 44a may be perpendicular to the polarization direction of the second polarization plate 46 and the polarization direction of light transmitted through the second birefringent elements 44b may be parallel to the polarization direction of the second polarization plate 46. Second, the polarization direction of light transmitted through the first birefringent elements 44a may be parallel to the polarization direction of the second polarization plate 46 and the polarization direction of light transmitted through the second birefringent elements 44b may be perpendicular to the polarization direction of the second polarization plate 46. The first and second polarization states are switched at the same time when the polarization switch 43 is switched between the first state and the second state.

The lenticular lens sheet 45 emits incident light to a specific illumination zone. To this end, the lenticular lens sheet 45 is formed by arranging a plurality of vertical lenticular lens elements in a horizontal direction. That is, the lenticular lens elements elongate in the vertical direction of the autostereoscopic display apparatus 30 in parallel to the birefringent elements 44a and 44b of the birefringent element array 44.

In this structure, light incident on the lenticular lens sheet 45 is separately directed to the different illumination zones 50a and 50b at the viewing distance according to its incident position. For example, light emitted from the first birefringent elements 44a may be directed to a first illumination zone 50a by the lenticular lens sheet 45, and light emitted from the second birefringent elements 44b may be directed to a second illumination zone 50b by the lenticular lens sheet 45. To this end, the pitch between the lenticular lens elements of the lenticular lens sheet 45 may be equal to, or preferably slightly smaller than, the pitch between the first and second birefringent element pairs of the birefringent array 44. That is, the width of a lenticular lens element is equal to or slightly smaller than the sum of the widths of a first birefringent element 44a and a second birefringent element 44b. Also, the width of each of the illumination zones 50a and 50b at the viewing distance can be controlled by adjusting a distance D between the birefringent element array 44 and the lenticular lens sheet 45. For example, the less the distance D is between the birefringent element array 44 and the lenticular lens sheet 45, the greater the width is of each of the illumination zones 50a and 50b. The greater the distance D is between the birefringent element array 44 and the lenticular lens sheet 45, the smaller the width is of each of the illumination zones 50a and 50b.

The operation of the directional backlight unit 31 constructed as above will now be explained in detail.

For convenience of explanation, it is assumed that the first polarization plate 42 has a horizontal polarization direction and the second polarization plate 46 has a vertical polarization direction. Also, it is assumed that the polarization switch 43 is a liquid crystal retarder having a first state in which the polarization direction of incident light is not changed and a second state in which the polarization direction of incident light is changed by 90°. Also, it is assumed that the first birefringent elements 44a are retarders that do not produce any phase shift and the second birefringent elements 44b are retarders that delay the phase of light by a half wavelength ($\lambda/2$).

The case where the polarization switch 43 is in the first state will be explained first.

When the polarization switch 43 is in the first state, the polarization direction of light transmitted through the first polarization plate 42 and incident on the polarization switch 43 is not changed. Accordingly, the light transmitted through the polarization switch 43 has a horizontal polarization direction. Next, the light is transmitted through the first and second birefringent elements 44a and 44b. Here, while light transmitted through the first birefringent elements 44a has a horizontal polarization direction, light transmitted through the second birefringent elements 44b is rotated by 90° and has a vertical polarization direction. The light transmitted through the first and second birefringent elements 44a and 44b is separated and directed to the first and second illumination zones 50a and 50b. However, the light transmitted through the first birefringent elements 44a is blocked by the second polarization plate 46 because its polarization direction is perpendicular to the polarization direction of the second polarization plate 46. Meanwhile, the light transmitted through the second birefringent elements 44b passes through the polarization plate 46 and is directed to the plurality of second illumination zones 50b because its polarization direction is parallel to the polarization direction of the second polarization plate 46. Here, the distribution of light directed to the second illumination zones 50b is called a second angular distribution of illumination.

On the contrary, when the polarization switch 43 is in the second state, light transmitted through the first polarization plate 42 and incident on the polarization switch 43 is rotated by 90°. Accordingly, the light transmitted through the polarization switch 43 has a vertical polarization direction. Next, the light is transmitted through the first and second birefringent elements 44a and 44b. Here, while light transmitted through the first birefringent elements 44a has a vertical polarization, light transmitted through the second birefringent elements 44b is rotated by 90° again and has a horizontal polarization direction. The light transmitted through the first and second birefringent elements 44a and 44b is separated and directed to the first and second illumination zones 50a and 50b by the lenticular lens sheet 45. However, the light transmitted through the second birefringent elements 44b is blocked by the second polarization plate 46 because its polarization direction is perpendicular to the polarization direction of the second polarization plate 46. Meanwhile, the light transmitted through the first birefringent elements 44a passes through the second polarization plate 46 and is directed to the plurality of first illumination zones 50a because its polarization direction is parallel to the polarization direction of the second polarization plate 46. Here, the distribution of light directed to the first illumination zones 50a is called a first angular distribution of illumination.

As described above, as the polarization switch 43 is switched between the first state and the second state, light emitted from the directional backlight unit 31 is directed to the plurality of second illumination zones 50b, or to the plurality of first illumination zones 50a. That is, the directional backlight unit 31 can be switched between the first and second angular distributions of illumination. Accordingly, the directional backlight unit 31 can selectively provide light to a certain area of the display panel 31 by being synchronized with the image display period of the display panel 31 according to a synchronization signal provided by the backlight controller 35.

Figure 5:
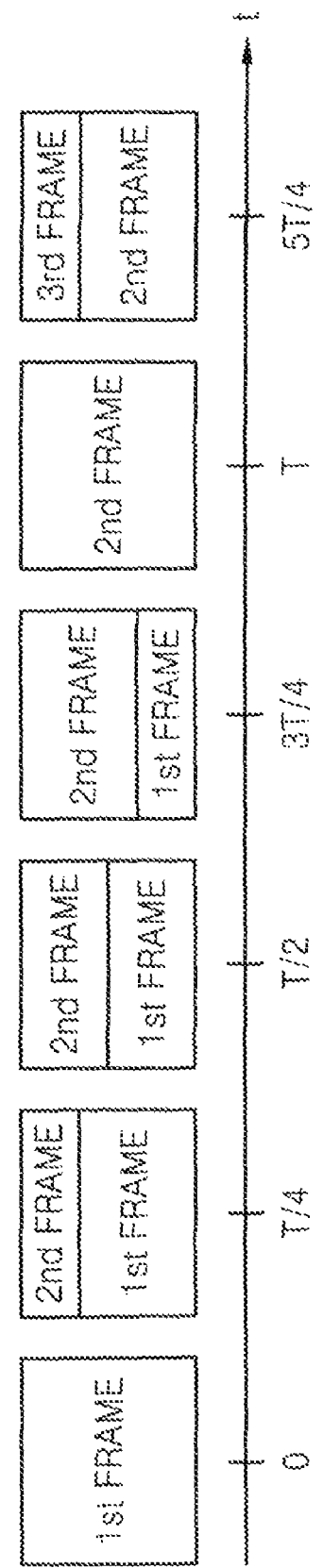
FIG. 5 illustrates a process of sequentially scanning an image made of a plurality of frames onto a display panel.

However, a display panel does not simultaneously display an image of a frame and then an image of a next frame. In general, a display panel sequentially scans images of consecutive frames on a screen from up to down as shown in FIG. 5. Accordingly, while images of two frames share the screen, for example, for times T/4 through 3T/4 of FIG. 5, crosstalk may occur because two images of different view points are not completely separated and sensed by the left and right eyes at the same time.

Figure 6:
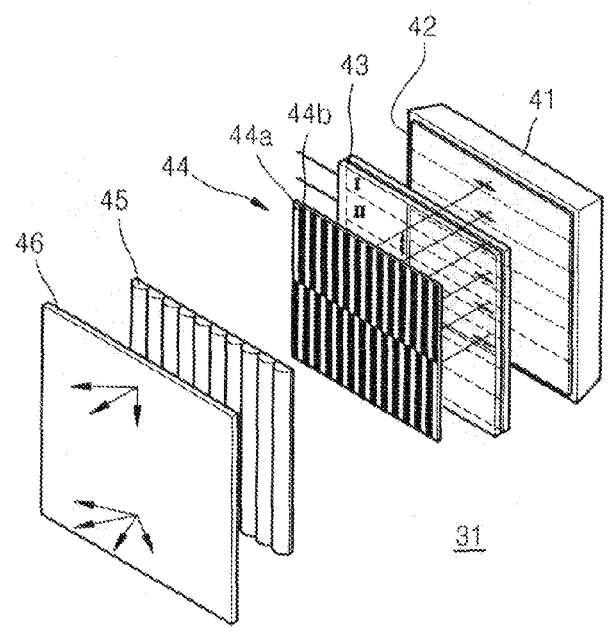
FIG. 6 is an exploded perspective view illustrating the directional backlight unit of FIG. 4 including a division type polarization switch.

To prevent such crosstalk, the directional backlight unit 31 according to the present exemplary embodiment may use a divided type polarization switch 43 which is divided into N segments as shown in FIG. 6. That is, the polarization switch 43 is divided into a plurality of horizontal segments that are sequentially switched in synchronization with image display periods of corresponding pixel lines of the display panel 32. To this end, the respective horizontal segments of the polarization switch 43 can be independently switched and are arranged in a vertical direction.

According to the present exemplary embodiment, the number of the segments of the polarization switch 43 can be properly selected according to design specification. To completely eliminate crosstalk, it is most preferable that one segment corresponds to one pixel line of the display panel 32. However, this causes too high of manufacturing costs to be carried out. Accordingly, one horizontal segment of the polarization switch 43 corresponds to a plurality of pixel lines of the display panel 32. For example, one segment of the polarization switch 43 may correspond to 100 pixel lines of the display panel 32.

Figure 7:
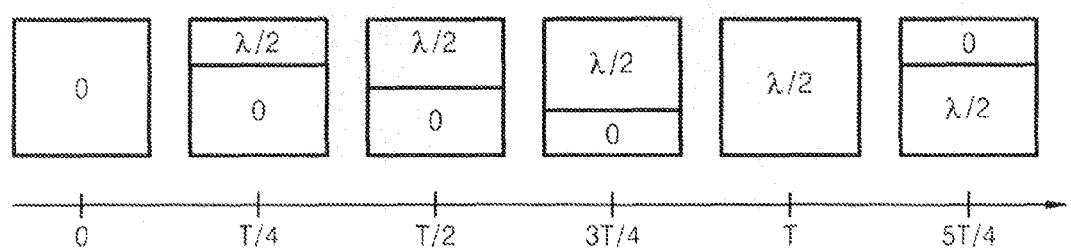
FIG. 7 sequentially illustrates a switching operation of the polarization switch that is divided into a plurality of segments.

In this structure, each horizontal segment of the polarization switch 43 may be switched to the first state when the corresponding pixel lines of the display panel 32 display an image of a frame and then may be switched to the second state when the corresponding pixel lines of the display panel 32 display an image of a next frame. FIG. 7 illustrates a switching operation of the divided type polarization switch 43. The polarization switch 43 of FIG. 7, which is divided into four segments, is a liquid crystal retarder that dos not delay incident light in the first state and delays the phase of incident light by a half wavelength ($\lambda/2$) in the second state. Referring to FIG. 7, the polarization switch 43 is substantially in the first state at a time 0, and is substantially in the second state at a time T. For the times 0 through T, the polarization switch 43 changes from the first state to the second state in synchronization with the display panel 32. It is controlled that the switching operation of the polarization switch 43 is precisely synchronized with a time when the display panel 32 displays an image of each frame. As a result, even when images of two frames share the screen, crosstalk hardly occurs.

Various operations of the multi-view autostereoscopic display apparatus 30 will now be explained in detail.

Figure 8A:
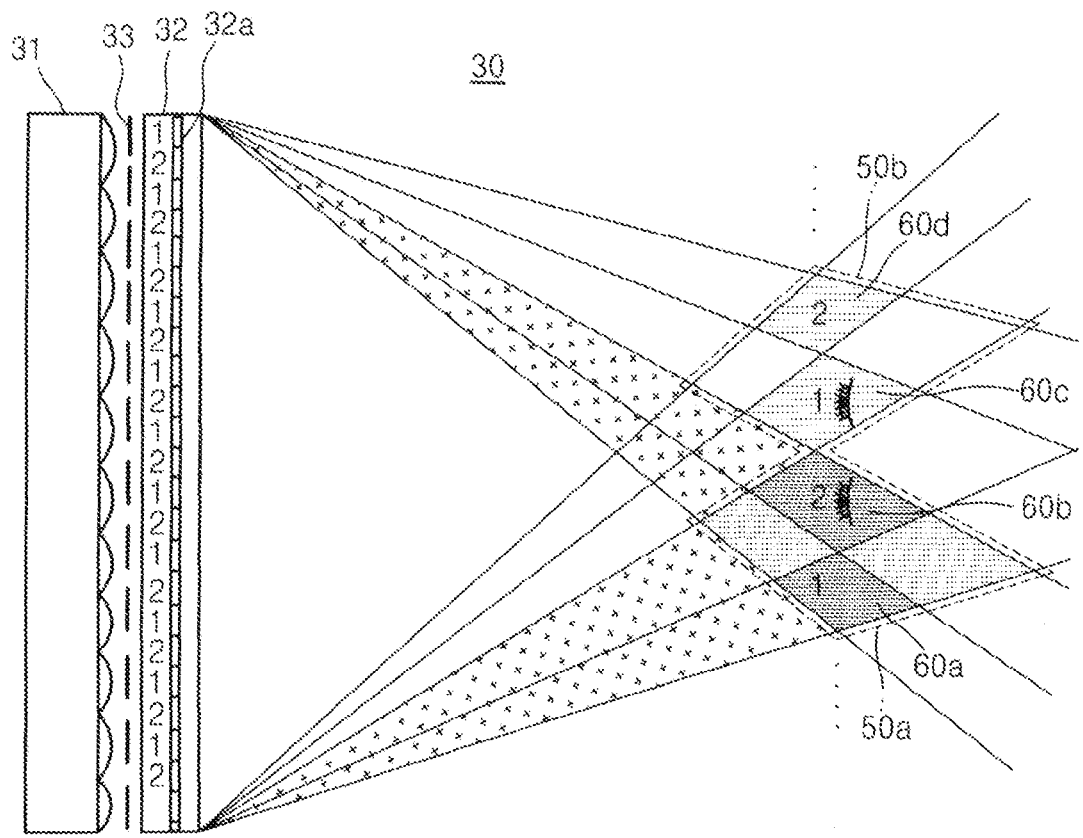
FIGS. 8A and 8B illustrate an operation of the multi-view autostereoscopic display apparatus of FIG. 3.
Figure 8B:
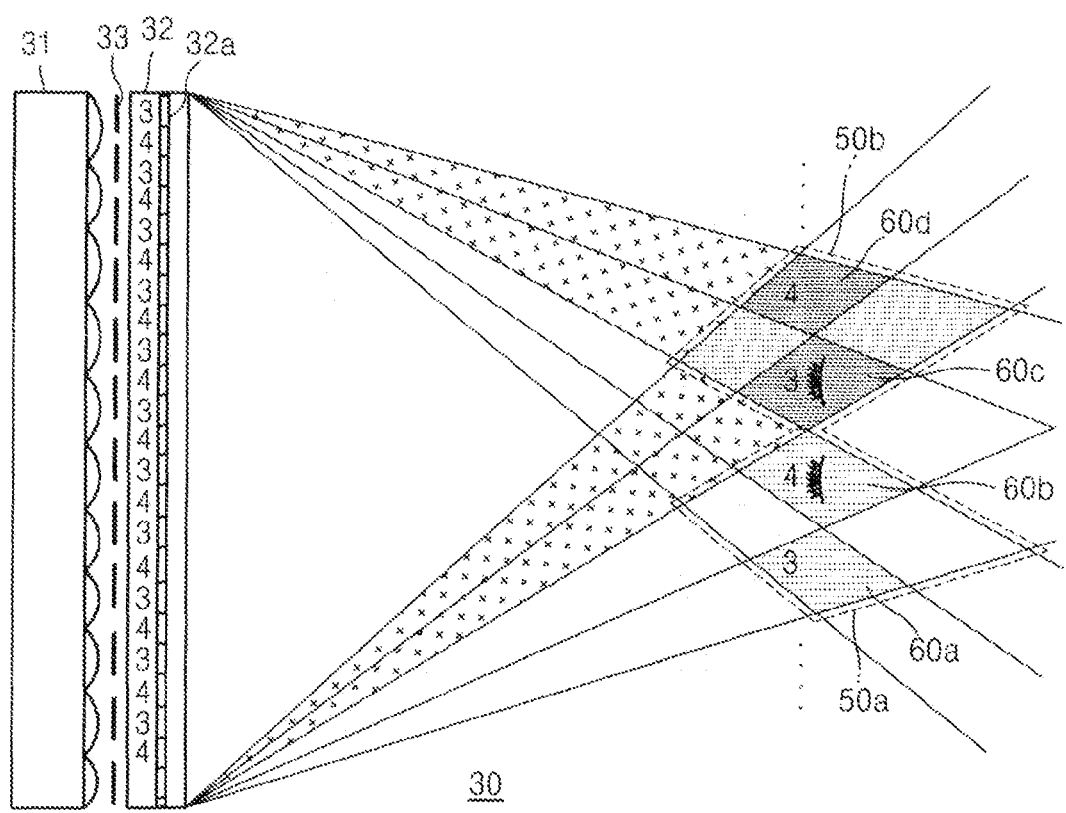

FIGS. 8A and 8B illustrate an operation of the multi-view autostereoscopic display apparatus 30. Referring to FIGS. 8A and 8B, one of illumination zones 50a and 50b formed by the directional backlight unit 31 corresponds to two of viewing zones 60a through 60d formed by the image separating means 33. As described above, the width of each of the illumination zones 50a and 50b can be controlled by adjusting the distance D between the birefringent element array 44 and the lenticular lens sheet 45. Similarly, the width of each viewing zone can be controlled by adjusting the distance between the image separating means 33 and the display panel 32. Accordingly, two viewing zones can be controlled to correspond to one illumination zone by appropriately controlling the distance D between the birefringent element array 44 and the lenticular lens sheet 45 and the distance between the image separating means 33 and the display panel 32.

Referring to FIG. 8A, in a first frame, the display panel 32 alternately displays a first image and a second image of different view points in a horizontal direction. For example, the display panel 32 displays the first image on even column pixels and the second image on odd column pixels. Consequently, the first image can be observed in the first viewing zone 60a and the third viewing zone 60c by the image separating means 33. The second image can be observed in the second viewing zone 60b and the fourth viewing zone 60d by the image separating means 33. Here, the directional backlight unit 31 is switched to direct light to the first illumination zone 50a corresponding to the first and second viewing zones 60a and 60b. Since light is directed only to the first illumination zone 50a, the images can be observed actually only in the first and second viewing zones 60a and 60b.

Referring to FIG. 8B, in a next frame, the display panel 32 alternately displays a third image and a fourth image of different view points in a horizontal direction. For example, the display panel 32 displays the third image on even column pixels and the fourth image on odd column pixels. Here, the view points of the third and fourth images are slightly different from those of the first and second images. The third image can be observed in the first viewing zone 60a and the third viewing zone 60c by the image separating means 33, and the fourth image can be observed in the second viewing zone 60b and the fourth viewing zone 60d by the image separating means 33. Here, the directional backlight unit 31 is switched to direct light to the second illumination zone 50b. Since light is directed only to the second illumination zone 50b, the images can be actually observed only in the third and fourth viewing zones 60c and 60d. The multi-view autostereoscopic display apparatus 30 repeats this operation of FIGS. 8A and 8B.

Figure 9:
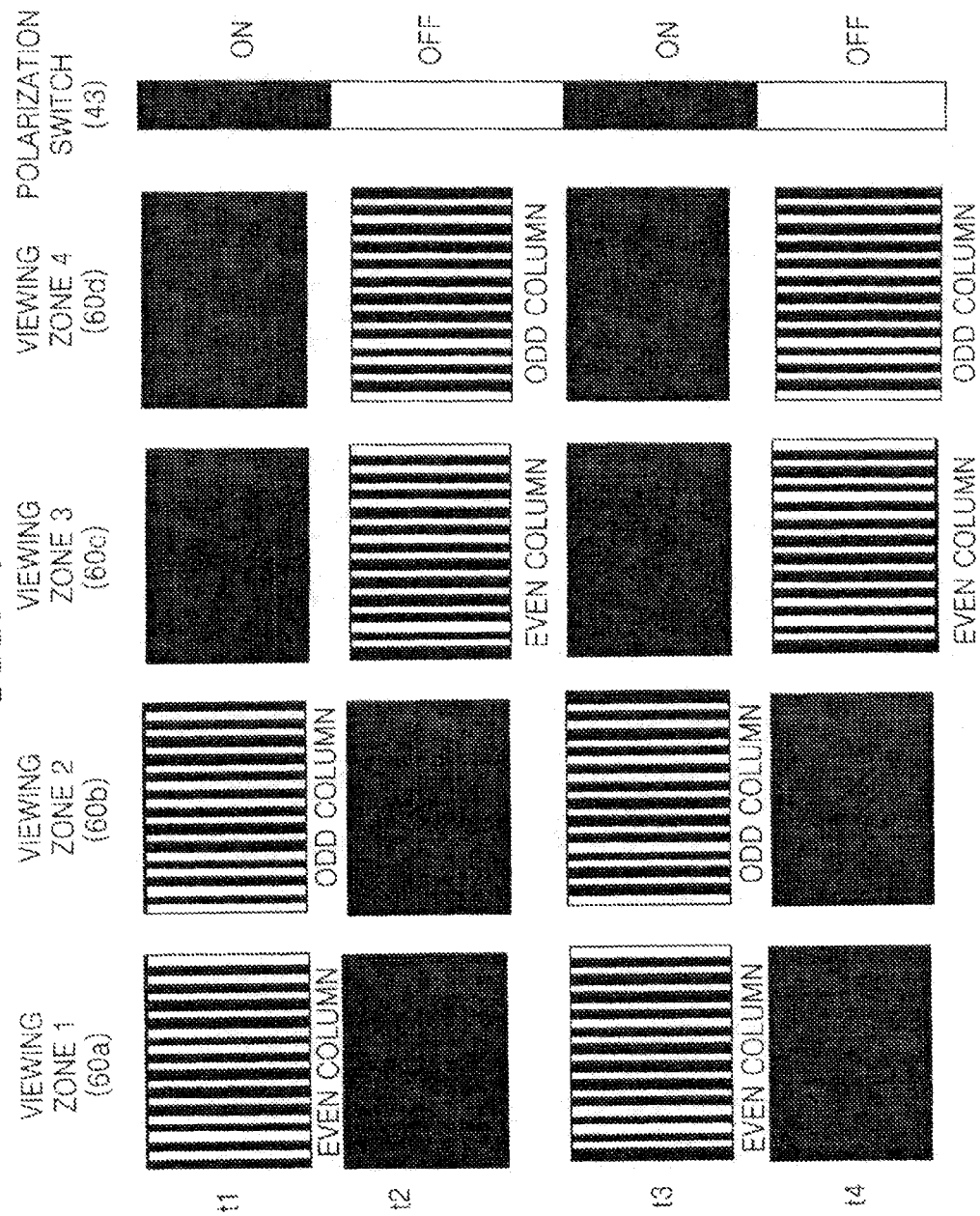
FIG. 9 is a timing diagram illustrating images observed from respective view points by the operation of FIGS. 8A and 8B.

FIG. 9 is a timing diagram illustrating the images observed from the respective view points by the operation illustrated in FIGS. 8A and 8B. Referring to FIG. 9, when a viewer's left eye is in the first viewing zone 60a and his or her right eye is in the second viewing zone 60b, the left eye observes the first image and the right observes the second image at a time t1, and both the left eye and the right eye observe a black screen at a time t2. When the viewer's left eye is in the second viewing zone 60b and his or her right eye is in the third viewing zone 60c, the left eye observes the second image and the right eye observes a black screen at the time t1, and the left eye observes a black screen and the right eye observes the third image at the time t2. When the viewer's left eye is in the third viewing zone 60c and his or her right eye is in the fourth viewing zone 60d, both the left eye and the right eye observes black screens at the time t1, and the left eye observes the third image and the right eye observes the fourth image at the time t2. Accordingly, for the times t1 and t2, the viewer can see a stereoscopic image. Here, to avoid image flicker, the display panel 32 may have a high refresh rate of about 100 to 120 Hz. According to the present embodiment, since the high speed display panel 32 is used and images of different view points are alternately displayed for two frames, the multi-view autostereoscopic display apparatus 30 can provide higher resolution than its conventional counterpart.

Figure 10A:
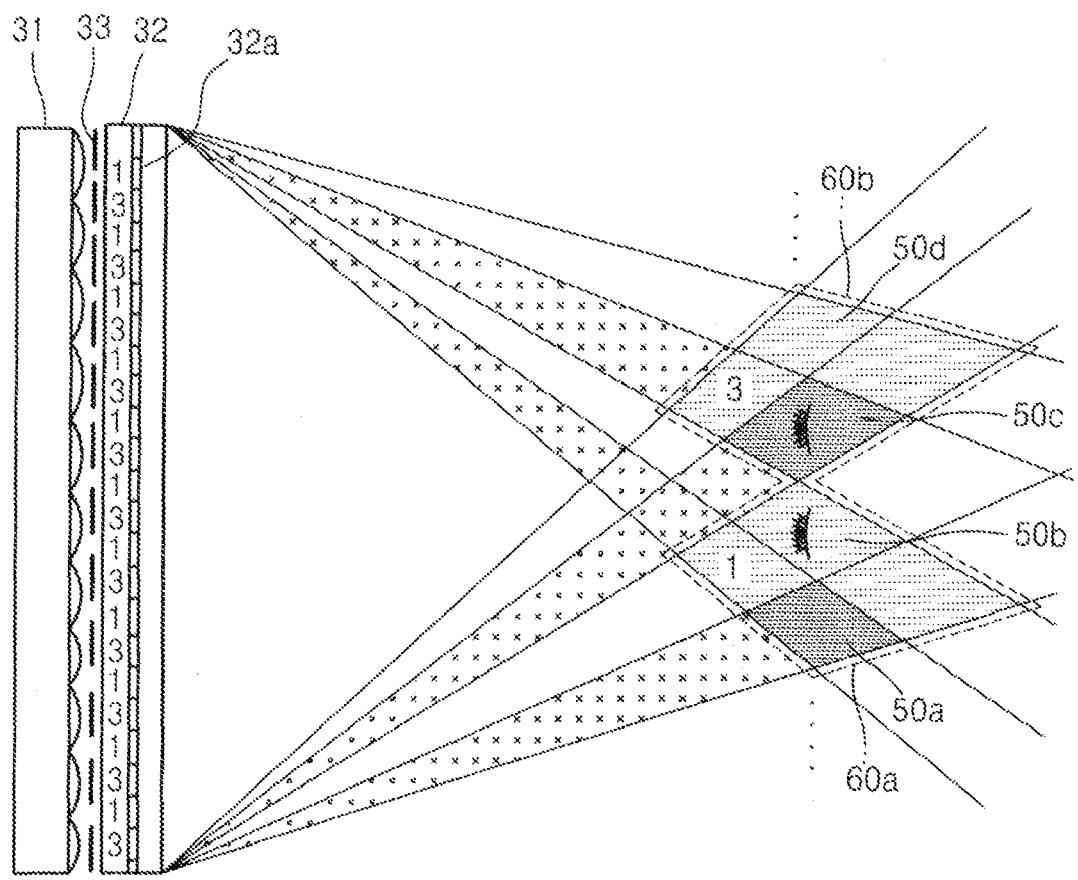
FIGS. 10A and 10B illustrate another operation of the multi-view autostereoscopic display apparatus of FIG. 3.
Figure 10B:
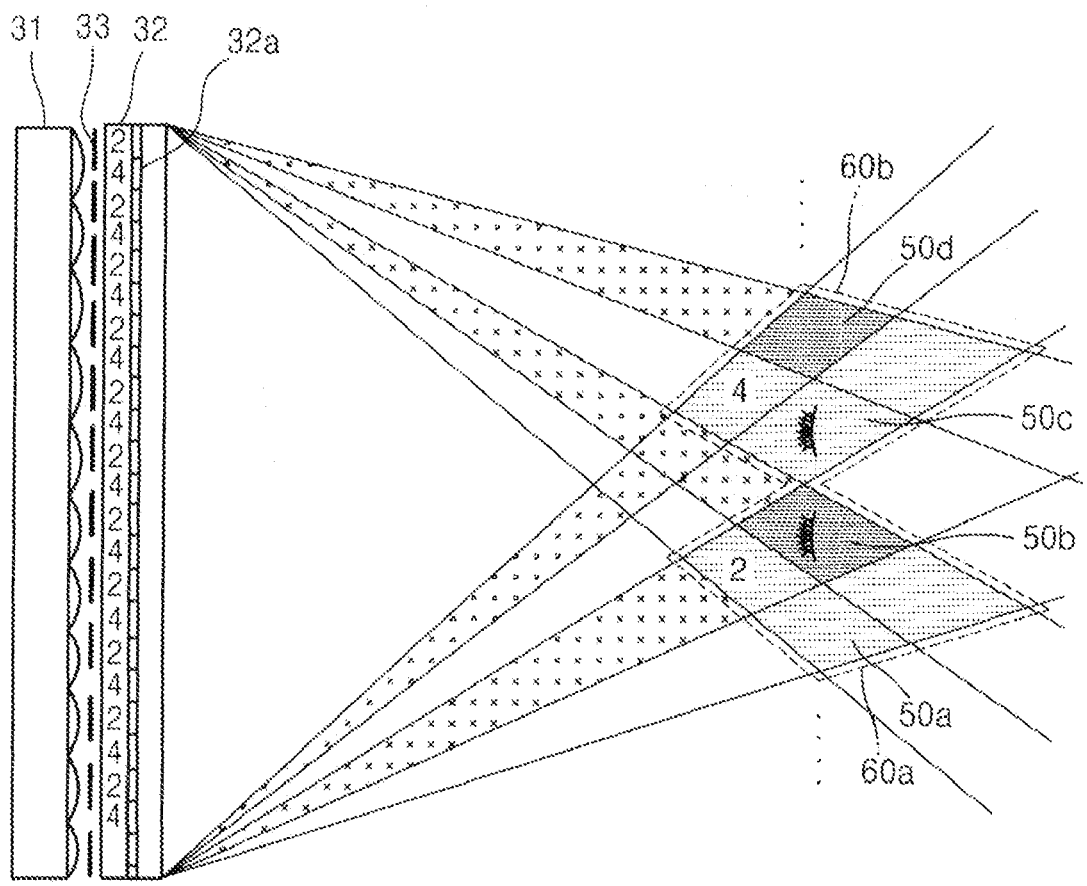

FIGS. 10A and 10B illustrate another operation of the multi-view autostereoscopic display apparatus 30. Referring to FIGS. 10A and 10B, two of the illumination zones 50a through 50d formed by the directional backlight unit 31 correspond to one of viewing zones 60a and 60b formed by the image separating means 33. As described above, one viewing zone can be controlled to correspond to two illumination zones by controlling the distance D between the birefringent element array 44 and the lenticular lens sheet 45 and the distance between the image separating means 33 and the display panel 32.

Referring to FIG. 10A, in a first frame, the display panel 32 alternately displays a first image and a third image of different view points in a horizontal direction. For example, the display panel 32 displays the first image on even column pixels and the third image on odd column pixels. Then, the first image can be observed in the first viewing zone 60a and the third image can be observed in the second viewing zone 60b by the image separating means 33. Here, the directional backlight unit 31 is switched to direct light to a half of each of the first and second viewing zones 60a and 60b. That is, light is directed only to the first illumination zone 50a within the first viewing zone 60a and to the third illumination zone 50c within the second viewing zone 60b.

Referring to FIG. 10B, in a next frame, the display panel 32 alternately displays a second image and a fourth image of different view points in a horizontal direction. For example, the display panel 32 displays the second image on even column pixels and the fourth image on odd column pixels. Here, the view points of the second and fourth images are slightly different from those of the first and third images. Then, the second image can be observed in the first viewing zone 60a and the fourth image can be observed in the second viewing zone 60b by the image separating means 33. Here, the directional backlight unit 31 is switched to direct light to the other half of each of the first and second viewing zones 60a and 60b. That is, light is directed only to the second illumination zone 50b within the first viewing zone 60a and to the fourth illumination zone 50d within the second viewing zone 60b.

Figure 11:
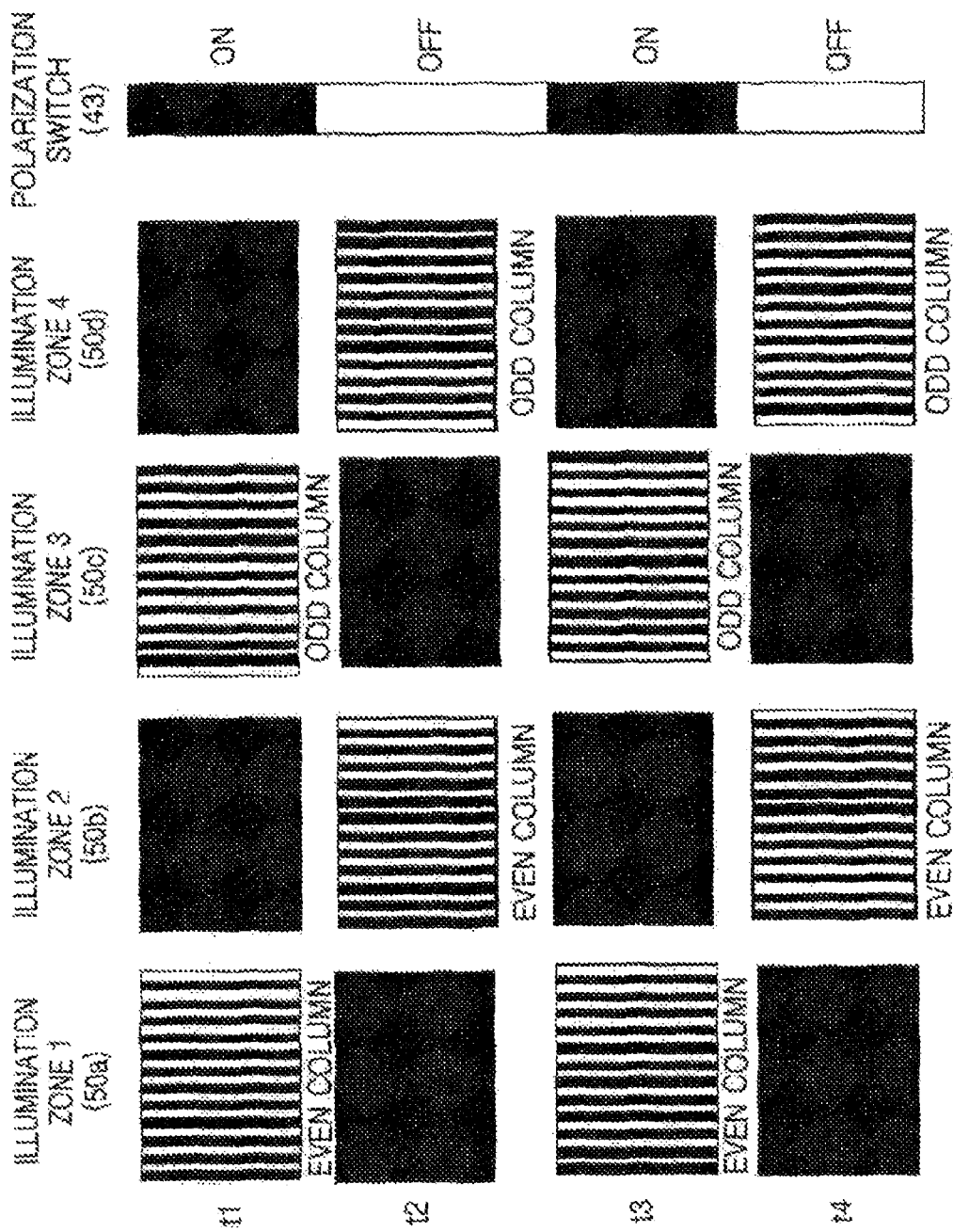
FIG. 11 is a timing diagram illustrating images observed from respective view points by the operation of FIGS. 10A and 10B.

FIG. 11 is a timing diagram illustrating the images observed in the respective illumination zones by the operation illustrated in FIGS. 10A and 10B. Referring to FIG. 11, when the viewer's left eye is in the first illumination zone 50a and his or her right eye is in the second illumination zone 50b, the left eye observes the first image and the right eye observes a black screen at a time t1, and the left eye observes a black screen and the right eye observes the second image at a time t2. When the viewer's left eye is in the second illumination zone 50b and his or her right eye is in the third illumination zone 50c, the left eye observes a black screen and the right eye observes the third image at the time t1, and the left eye observes the second image and the right eye observes a black screen at the time t2. When the viewer's left eye is in the third illumination zone 50c and his or her right eye is in the fourth illumination zone 50d, the left eye observes the third image and the right eye observes a black screen at the time t1, and the left eye observes a black screen and the right eye observes the fourth image at the time t2. Accordingly, during the operation of FIGS. 10a and 10B, since both the left eye and the right eye do not observe a black screen at any time, image flicker can be avoided in a more ensured fashion.

Figure 12:
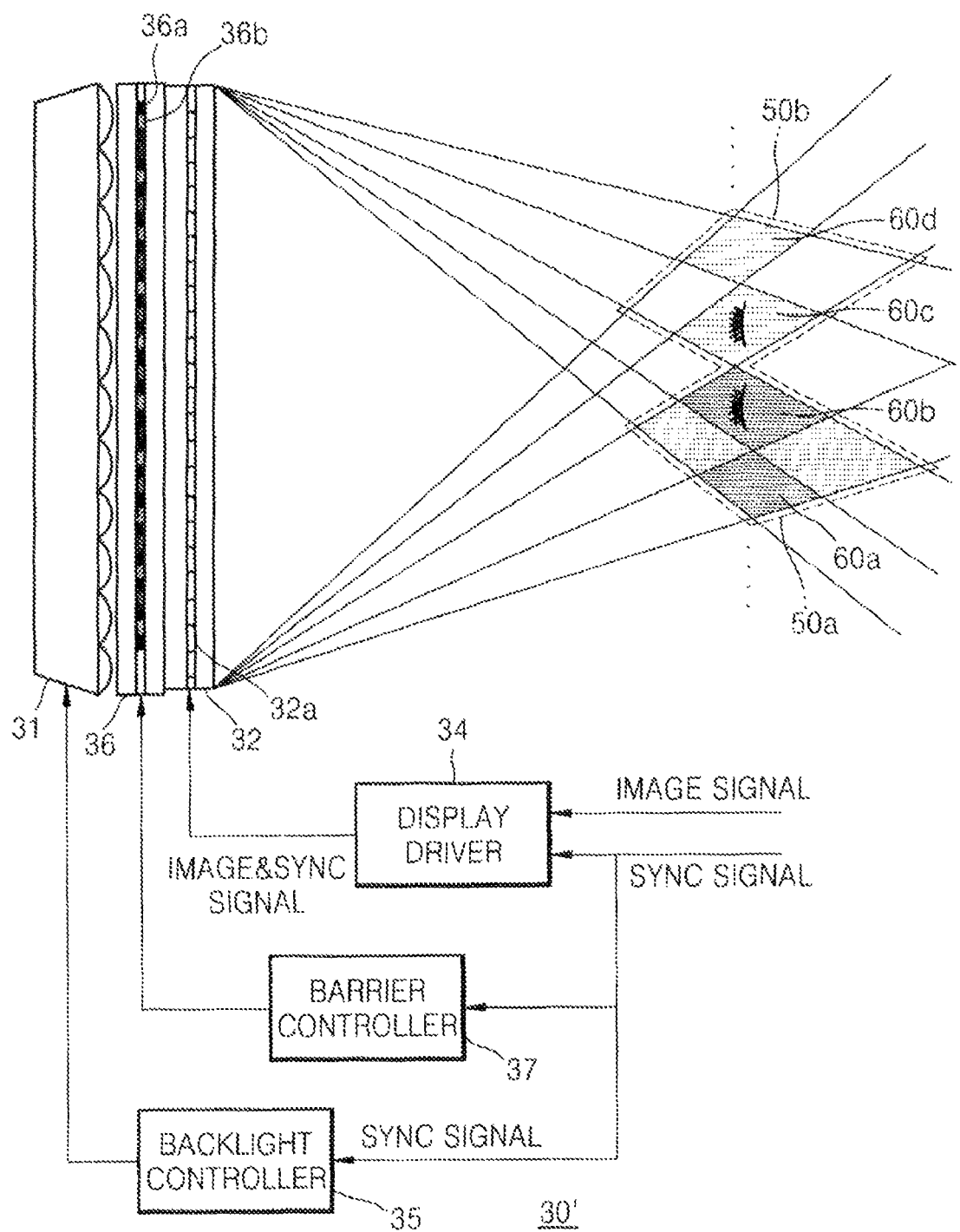
FIG. 12 shows schematically a high resolution multi-view autostereoscopic display apparatus according to another exemplary embodiment of the present invention.

FIG. 12 shows schematically a high resolution multi-view autostereoscopic display apparatus 30' according to another exemplary embodiment of the present invention. The aforementioned multi-view autostereoscopic display apparatus 30 has a higher resolution than a conventional multi-view autostereoscopic display apparatus, but still has a lower resolution than the original resolution. The multi-view autostereoscopic display apparatus 30' of FIG. 12 provides a higher resolution than the multi-view autostereoscopic display apparatus 30 of FIGS. 8 through 11.

Referring to FIG. 12, the autostereoscopic display apparatus 30' is structurally identical to the aforesaid autostereoscopic display apparatus 30 except for the image separating means. That is, the autostereoscopic display apparatus 30' uses as an image separating means a switchable parallax barrier 36 which includes a spatial light modulator having a plurality of cells 36a and 36b switched between a transparent state and an opaque state according to a power ON/OFF procedure. For example, the switchable parallax barrier 36 may be switched between two states where the positions of transparent cells and opaque cells are opposite by being synchronized with the image display period of the display panel 32 according to a synchronization signal provided by a barrier controller 37. For example, when the switchable parallax barrier 36 is in an ON state, odd cells 36b may be transparent and even cells 36 may be opaque when seen from the bottom. When the switchable parallax barrier 36 in an OFF state, the even cells 36a may be transparent and the odd cells 36b may be opaque.

Various operations of the multi-view autostereoscopic display apparatus 30' of FIG. 12 will now be explained.

Like in FIGS. 8A and 8B, it is assumed that one of illumination zones 50a and 50b formed by the directional backlight unit 31 corresponds to two of viewing zones 60a through 60d formed by the switchable parallax barrier 36. Also, it is assumed that the positions of transparent odd cells when the switchable parallax barrier 36 is in the ON state are identical to the positions of slits of the parallax barrier of the image separating means 33 illustrated in FIG. 3.

Figure 13:
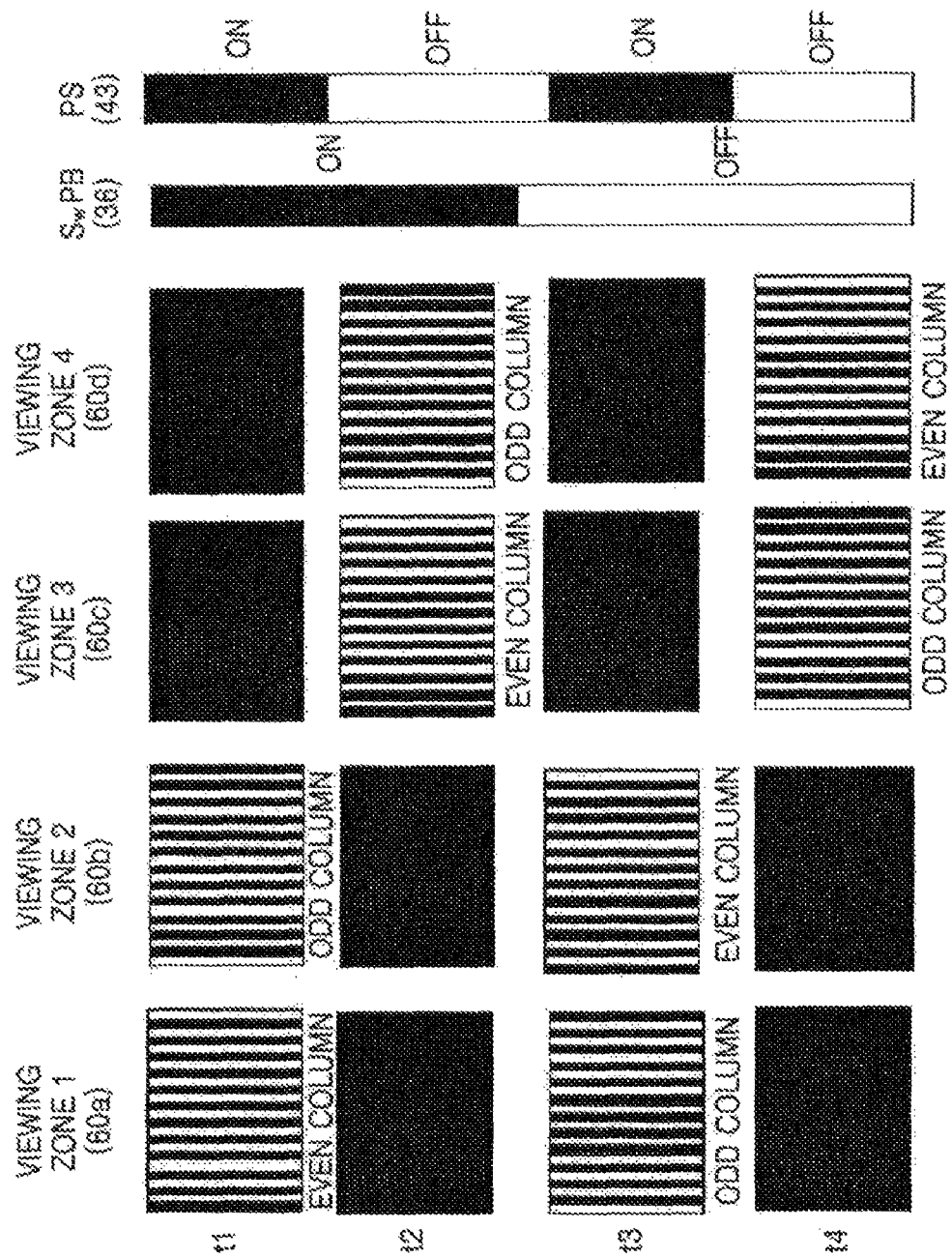
FIG. 13 is a timing diagram illustrating images observed from respective view points by an operation of the autostereoscopic display apparatus of FIG. 12.

In a first frame, the switching parallax barrier 36 is in the ON state. The display panel 32 alternately displays a first image and a second image of different view points in a horizontal direction. For example, the display panel 32 may display the first image on even column pixels and the second image on odd column pixels. The first image can be observed in the first viewing zone 60a and the third viewing zone 60c and the second image can be observed in the second viewing zone 60b and the fourth viewing zone 60d by the switchable parallax barrier 36. The directional backlight unit 31 is switched to direct light to the first illumination zone 50a corresponding to the first and second viewing zones 60a and 60b. Then, since light is directed to the first illumination zone 50a, the images can be observed actually only in the first and second viewing zones 60a and 60b. Accordingly, referring to FIG. 13, at a time t1, the first image is observed in the first viewing zone 60a, the second image is observed in the second viewing zone 60b, and a black screen is observed in each of the third and fourth viewing zones 60c and 60d.

In a second frame, the switchable parallax barrier 36 is still in the ON state. The display panel 32 alternately displays a third image and a fourth image of different view points in a horizontal direction. For example, the display panel 32 displays the third image on even column pixels and the fourth image on odd column pixels. Then, the third image can be observed in the first viewing zone 60a and the third viewing zone 60c and the fourth image can be observed in the second viewing zone and the fourth viewing zone 60d by the switchable parallax barrier 36. The directional backlight unit 31 is switched to direct light to the second illumination zone 50b corresponding to the third and fourth viewing zones 60c and 60d. Then, since light is directed only to the second illumination zone 50b, the images can be observed actually only in the third and fourth viewing zones 60c and 60d. Accordingly, referring to FIG. 13, at a time t2, a black screen is observed in each of the first and second viewing zones 60a and 60b, the third image is observed in the third viewing zone 60c, and the fourth image is observed in the fourth viewing zone 60d.

In a third frame, the switchable parallax barrier 36 is switched to the OFF state. Unlike that in the first frame, the display panel 32 displays a second image on even column pixels and a first image on odd column pixels. However, since the positions of transparent cells of the switchable parallax barrier 36 are different from those in the first frame, the first image is still observed in the first viewing zone 60a and the third viewing zone 60c, and the second image is still observed in the second viewing zone 60b and the fourth viewing zone 60d. Here, the directional backlight unit 31 is switched to direct light to the first illumination zone 50a corresponding to the first and second viewing zones 60a and 60b. Then, since light is directed only to the first illumination zones 50a, the images can be actually observed only in the first and second viewing zones 60a and 60b. Accordingly, referring to FIG. 13, at a time t3, the first image is observed in the first viewing zone 60a, the second image is observed in the second viewing zone 60b, and a black screen is observed in each of the third and fourth viewing zones 60c and 60d.

In a fourth frame, the switchable parallax barrier 36 is still in the OFF state. Unlike that in the second frame, the display panel 32 displays a fourth image on even column pixels and a third image on odd column pixels. Similarly, since the positions of transparent cells in the switchable parallax barrier 36 are different from those in the second frame, the third image is still observed in the first viewing zone 60a and the third viewing zone 60c, and the fourth image is observed in the second viewing zone 60b and the fourth viewing zone 60d. Here, the directional backlight unit 31 is switched to direct light to the second illumination zone 50b corresponding to the third and fourth viewing zones 60c and 60d. Then, since light is directed only to the second illumination zone 50b, the images can be observed actually only in the third and fourth viewing zones 60c and 60d. Accordingly, referring to FIG. 13, at a time t4, a black screen is observed in each of the first and second viewing zones 60a and 60b, the third image is observed in the third viewing zone 60c, and the fourth image is observed in the fourth viewing zone 60d. The first through fourth frames are repeated in this manner.

In the present exemplary embodiment, the first images respectively displayed in the first frame and the third frame are interlaced images of the same image. That is, the first image displayed in the first frame and the first image displayed in the third frame are an even column pixel component and an odd column pixel component of the same image having an original resolution. Accordingly, when the first image displayed in the first frame and the first image displayed in the third frame are combined together, one complete image can be obtained. In the same manner, the second image displayed in the first frame and the second image displayed in the third frame are respectively an odd column pixel component and an even column pixel component of the same image having an original resolution. Also, the third images and the fourth images displayed in the second frame and the fourth frame are interlaced images of one complete image, respectively.

This operation is similar to an interlaced scanning which is a standard scanning method used for televisions. A television shows a complete image on every other scan by scanning odd lines and then even lines. As such, the image can be displayed without flicker and without resolution reduction at a relatively slow scanning rate of 25 Hz (PAL) or 30 Hz (NTSC). Since the first through fourth images are interlaced and displayed over the four frames in the present exemplary embodiment, the multi-view autostereoscopic display apparatus 30' can hardly cause resolution reduction and flicker.

FIG. 14 is a timing diagram illustrating that two of illumination zones 50a through 50d formed by the directional backlight unit 31 correspond to one of viewing zones 60a and 60b formed by the switchable parallax barrier 36, like that in FIGS. 10A and 10B.

In this case, the display panel 32 alternately displays a first image on even column pixels and a third image on odd column pixels in a first frame. The display panel 32 alternately displays a second image on even column pixels and a fourth image on odd column pixels in a second frame. The display panel 32 alternately displays a first image on odd column pixels and a third image on even column pixels in a third frame. The display panel 32 alternately displays a second image on odd column pixels and a fourth image on even column pixels in a fourth frame.

In the first and third frames, the directional backlight unit 31 are switched to direct light to a half of each of the first and second viewing zones 60a and 60b. That is, in the first and third frames, light is directed only to the first illumination zone 50a within the first viewing zone 60a and to the third illumination zone 50c within the second viewing zone 60b. Also, in the second and fourth frames, the directional backlight unit 31 is switched to direct light to the other half of each of the first and second viewing zones 60a and 60b. That is, in the second and fourth frames, light is directed only to the second illumination zone 50b within the first viewing zone 60a and to the fourth illumination zone 50d within the second viewing zone 60b.

Also, the switchable parallax barrier SwPB 36 is switched to the ON state in the first and second frames and switched to the OFF state in the third and fourth frames.

Referring to FIG. 14, the first image is observed in the first illumination zone 50a, the third image is observed in the third illumination zone 50c, and a black screen is observed in each of the second and fourth illumination zones 50b and 50d at a time t1. At a time t2, and a black screen is observed in each of the first and third illumination zones 50a and 50c, the second image is observed in the second illumination zone 60b, and the fourth image is observed in the fourth illumination zone 60d. At a time t3, the first image is observed in the first illumination zone 50a, the third image is observed in the third illumination zone 50c, and a black screen is observed in each of the second and fourth illumination zones 50b and 50d. Also, at a time t4, a black screen is observed in each of the first and third illumination zones 50a and 50c, the second image is observed in the second illumination zone 60b, and the fourth image is observed in the fourth illumination zone 60d. Like that in FIG. 13, the first and third images respectively displayed in the first and third frames, and the second and fourth images respectively displayed in the second and fourth frames are interlaced images of one complete image, respectively. Accordingly, resolution reduction is avoided and, particularly since both the left eye and the right eye do not observe a black screen at any time, image flicker can be reduced in a more ensured manner.

Although the aforedescribed multi-view autostereoscopic display apparatus is a 4-view display apparatus, the present invention is not limited thereto, and a 6- or 8-view, or more multi-view autostereoscopic display apparatus can be realized based on the same structure and operating principle.

As described above, since a plurality of images are displayed over a plurality of frames in time sharing and interlacing methods, the multi-view autostereoscopic display apparatus according to the present invention can provide improved resolution with low flicker.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An autostereoscopic display apparatus comprising:
   a display panel alternately displaying a plurality of images of different view points;

image separating means for separating the plurality of images such that the separated images can be alternately observed in different viewing zones; and a directional backlight unit switched between a plurality of different angular distributions of illumination to selectively provide light to the display panel, wherein the directional backlight unit is switched between the plurality of different angular distributions of illumination in synchronization with an image display period of the display panel, and wherein the directional backlight unit comprises:
a backlight;
a first polarization plate disposed in front of the backlight;
a polarization switch which changes the polarization direction of incident light according to an electrical control;
a birefringent element array having a plurality of alternating first and second birefringent elements;
a lenticular lens sheet having a plurality of parallel lenticular lens elements; and
a second polarization plate disposed in front of the lenticular lens sheet.

2. The autostereoscopic display apparatus of claim 1, wherein the polarization switch is switched between first and second states, in which the polarization directions of light transmitted therethrough are perpendicular to each other, in synchronization with the image display period of the display panel.

3. The autostereoscopic display apparatus of claim 2, wherein the polarization switch does not change the polarization direction of incident light in the first state, and changes by 90° the polarization direction of incident light in the second state.

4. The autostereoscopic display apparatus of claim 2, wherein the polarization switch is divided into a plurality of horizontal segments.

5. The autostereoscopic display apparatus of claim 4, wherein one of the horizontal segments of the polarization switch corresponds to a plurality of pixel lines of the display panel, and the respective horizontal segments are sequentially switched in synchronization with image display periods of their corresponding pixel lines.

6. The autostereoscopic display apparatus of claim 2, wherein the polarization switch is an electrically controllable liquid crystal retarder.

7. The autostereoscopic display apparatus of claim 2, wherein the birefringent element array is formed by alternately arranging a plurality of vertical first and second birefringent elements in a horizontal direction.

8. The autostereoscopic display apparatus of claim 7, wherein the first and second birefringent elements respectively change the polarization directions of incident light such that the polarization directions of light transmitted therethrough can be perpendicular to each other.

9. The autostereoscopic display apparatus of claim 8, wherein the first and second birefringent elements are retarders that delay the phase of incident light, and a phase delay difference between the retarders of the first birefringent elements and the retarders of the second birefringent elements is $\lambda/2$.

10. The autostereoscopic display apparatus of claim 8, wherein,
when the polarization switch is in the first state, the polarization direction of light transmitted through the first birefringent elements is perpendicular to a polarization surface of the second polarization plate and the polarization direction of light transmitted through the second birefringent elements is parallel to the polarization surface of the second polarization plate, and
when the polarization switch is in the second state, the polarization direction of light transmitted through the first birefringent elements is parallel to the polarization surface of the second polarization plate and the polarization direction of light transmitted through the second birefringent elements is perpendicular to the polarization surface of the second polarization plate.

11. The autostereoscopic display apparatus of claim 1, wherein the lenticular lens sheet is configured such that a plurality of vertical lenticular lens elements parallel to the birefringent elements of the birefringent element array are arranged in a horizontal direction.

12. The autostereoscopic display apparatus of claim 11, wherein the pitch between the lens elements of the lenticular lens sheet is equal to or smaller than the pitch between the first and second birefringent element pairs of the birefringent element array.

13. The autostereoscopic display apparatus of claim 1, wherein, when the display panel is a liquid crystal display panel, the second polarization plate is an incident side polarization plate of the liquid crystal display panel disposed on the incident side of the liquid crystal display panel.

14. An autostereoscopic display apparatus comprising:
a display panel alternately displaying a plurality of images of different view points;
image separating means for separating the plurality of images such that the separated images can be alternately observed in different viewing zones; and
a directional backlight unit switched between a plurality of different angular distributions of illumination to selectively provide light to the display panel,
wherein the directional backlight unit is switched between the plurality of different angular distributions of illumination in synchronization with an image display period of the display panel,
wherein the image separating means is a switchable parallax barrier which includes a spatial light modulator having a plurality of cells switched between a transparent state and an opaque state according to a power ON/OFF procedure, and
wherein the display panel alternately displays a first image on even column pixels and a second image on odd column pixels in a first frame, alternately displays a third image on even column pixels and a fourth image on odd column pixel in a second frame, alternately displays a first image on odd column pixels and a second image on even column pixels in a third frame, and alternately displays a third image on odd column pixels and a fourth image on even column pixels.

15. The autostereoscopic display apparatus of claim 14, wherein the directional backlight unit alternately illuminates two viewing zones in a frame, and alternately illuminates another two viewing zones in a next frame.

16. The autostereoscopic display apparatus of claim 15, wherein the switchable parallax barrier is switched for every two frames between a state where odd cells are transparent and even cells are opaque and the other state where even cells are transparent and odd cells are opaque, by being synchronized with the image display period of the display panel.

17. An autostereoscopic display apparatus comprising:
a display panel alternately displaying a plurality of images of different view points;

image separating means for separating the plurality of images such that the separated images can be alternately observed in different viewing zones; and a directional backlight unit switched between a plurality of different angular distributions of illumination to selectively provide light to the display panel, wherein the directional backlight unit is switched between the plurality of different angular distributions of illumination in synchronization with an image display period of the display panel, and wherein the image separating means is one of a lenticular lens sheet and a parallax barrier.

18. The autostereoscopic display apparatus of claim 1, wherein the display panel alternately displays first and second images in a horizontal direction in a frame, and alternately displays third and fourth images in a horizontal direction in a next frame.

19. The autostereoscopic display apparatus of claim 18, wherein the directional backlight unit alternately illuminates two viewing zones in a frame, and alternately illuminates another two viewing zones in a next frame.

20. The autostereoscopic display apparatus of claim 1, wherein the display panel alternately displays first and third images in a horizontal direction in a frame, and alternately displays second and fourth images in a horizontal direction in a next frame.

21. The autostereoscopic display apparatus of claim 20, wherein the directional backlight unit illuminates a half of each viewing zone in a frame, and illuminates the other half of each viewing zone in a next frame.

22. The autostereoscopic display apparatus of claim 1, wherein the image separating means is a switchable parallax barrier which includes a spatial light modulator having a plurality of cells switched between a transparent state and an opaque state according to a power ON/OFF procedure.

23. The autostereoscopic display apparatus of claim 22, wherein the display panel alternately displays a first image on even column pixels and a third image on odd column pixels in a first frame, alternately displays a second image on even column pixels and a fourth image on odd column pixels in a second frame, alternately displays a first image on odd column pixels and a third image on even column pixels in a third frame, and alternately displays a second image on odd column pixels and a fourth image on even column pixels in a fourth frame.

24. The autostereoscopic display apparatus of claim 23, wherein the directional backlight unit illuminates a half of each viewing zone in a frame, and illuminates the other half of each viewing zone in a next frame.

25. The autostereoscopic display apparatus of claim 24, wherein the switchable parallax barrier is switched for every two frames between a state where odd cells are transparent and even cells are opaque and the other state where even cells are transparent and odd cells are opaque, by being synchronized with the image display period of the display panel.

* * * * *